United States Patent
Tate et al.

(10) Patent No.: US 6,493,751 B1
(45) Date of Patent: Dec. 10, 2002

(54) NETWORK CONFIGURATION METHOD AND SYSTEM FOR A WINDOW-BASED OPERATING SYSTEM ENVIRONMENT

(75) Inventors: Randy S. Tate, Midvale, UT (US); Randy C. Smith, Kaysville, UT (US); William M. Raines, Sandy, UT (US); Jennifer Baker, Park City, UT (US); Vinay Badami, Murray, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/256,153

(22) Filed: Feb. 24, 1999

(51) Int. Cl.[7] .............................................. G06F 15/177
(52) U.S. Cl. .......................... 709/221; 701/219; 707/1; 370/254
(58) Field of Search ................................. 709/327, 321, 709/310, 221, 220, 200, 227, 228; 370/254; 707/1, 7, 9, 103

(56) References Cited

U.S. PATENT DOCUMENTS

| | | | | |
|---|---|---|---|---|
| 5,838,907 A | * | 11/1998 | Hansen | 709/220 |
| 5,872,928 A | * | 2/1999 | Lewis et al. | 70/222 |
| 6,012,088 A | * | 1/2000 | Li et al. | 709/219 |
| 6,098,098 A | * | 8/2000 | Sandahl et al. | 709/221 |
| 6,161,133 A | * | 12/2000 | Kikinis | 709/220 |
| 6,226,678 B1 | * | 5/2001 | Mattaway et al. | 709/230 |
| 6,269,395 B1 | * | 7/2001 | Blatherwick et al. | 709/219 |
| 6,295,556 B1 | * | 9/2001 | Falcon et al. | 709/220 |

* cited by examiner

Primary Examiner—Zarni Maung
Assistant Examiner—Wen-Tai Lin
(74) Attorney, Agent, or Firm—Workman, Nydegger & Seeley

(57) ABSTRACT

A mobile configuration manager application is provided for managing network configuration parameters essential for the configuration of a computer for operable interaction in a local area network (LAN) or wide area network (WAN) environment. The network configuration parameters are partitioned into intuitive profiles that may be re-used in additional network configurations including LAN and WAN environments. The population of the profile parameters is facilitated by the application through the use of intuitive menus and windows with competed configurations being stored and selectively activated by a user without requiring subsequent parametric input by the user when selecting a different network environment. The transfer and exchange of network configuration parameters between different computers is also presented.

13 Claims, 13 Drawing Sheets

MOBILE CONFIGURATION #1

| NAME | XCORP RAS FROM HOME |
|---|---|
| DESCRIPTION | MODEM CONNECTION TO XCORP RAS IN LAKE CITY WHILE WORKING FROM HOME |
| DEVICE TYPE | MODEM |
| LOCATION PROFILE | HOME |
| DIAL-UP NETWORK PROFILE | XCORP TOATL CONTROL LAKE CITY |
| LAN PROFILE | N/A |
| GENERAL NETWORKING PROFILE | XCORP NETWORK |

MOBILE CONFIGURATION #2

| NAME | XCORP OFFICE LAKE CITY |
|---|---|
| DESCRIPTION | LAN CONNECTION TO XCORP CORPORATE NETWORK FROM Y DIVISION OFFICE IN LAKE CITY |
| DEVICE TYPE | LAN |
| LOCATION PROFILE | N/A |
| DIAL-UP NETWORK PROFILE | N/A |
| LAN PROFILE | XCORP Y DIVISION LAKE CITY OFFICE |
| GENERAL NETWORKING PROFILE | XCORP NETWORK |

LOCATION PROFILE INFO

1 - GENERAL
  - NAME
  - DESCRIPTION

2 - LOCATION INFO
  - COUNTRY
  - AREA CODE
  - OUTSIDE LINE ACCESS
  - LONG DISTANCE ACCESS
  - CALL WAITING DISABLE

3 - AREA CODE RULES
  - DIAL "1" AREA CODES

4 - CALLING CARD
  - SEQUENCES

5 - GLOBAL MODEM

FIG. 4

```
                          ┌─ 66
    DIAL-UP NETWORK PROFILE INFO

1 - GENERAL
            - NAME
            - DESCRIPTION

2 - PRIMARY DEVICE
            - NAME

3 - PHONE NUMBER
            - AREA CODE
            - TELEPHONE NUMBER
            - COUNTRY

4 - SERVER TYPE
            - TYPE
            - NETWORK PROTOCOLS

5 - TCP/IP
            - IP ADDRESS
            - SERVER ADDRESSES
                  - PRIMARY/SECONDARY DNS
                  - PRIMARY/SECONDARY WINS

6 - SCRIPTING
            - FILE NAME

7 - MULTI LINK
```

FIG. 5

```
LAN PROFILE INFO

1 - GENERAL
      - NAME
      - DESCRIPTION

2 - DEVICE
      - NAME

3 - TCP/IP
      - AUTOMATIC ADDRESSING WITH DHCP
      - IP ADDRESS
            - IP ADDRESS
            - SUBNET MASK

4 - GATEWAY
      - NEW GATEWAY
      - INSTALLED GATEWAY LIST

5 - DNS
      - ENABLE
      - HOST
      - DOMAIN
      - DNS SERVER IP ADDRESS LIST
      - DOMAIN SUFFIX SEARCH ORDER LIST

6 - WINS
      - ENABLE
      - WINS SERVER IP ADDRESS LIST
      - SCOPE ID
      - ENABLE DHCP FOR WINS RESOLUTION
```

FIG. 6

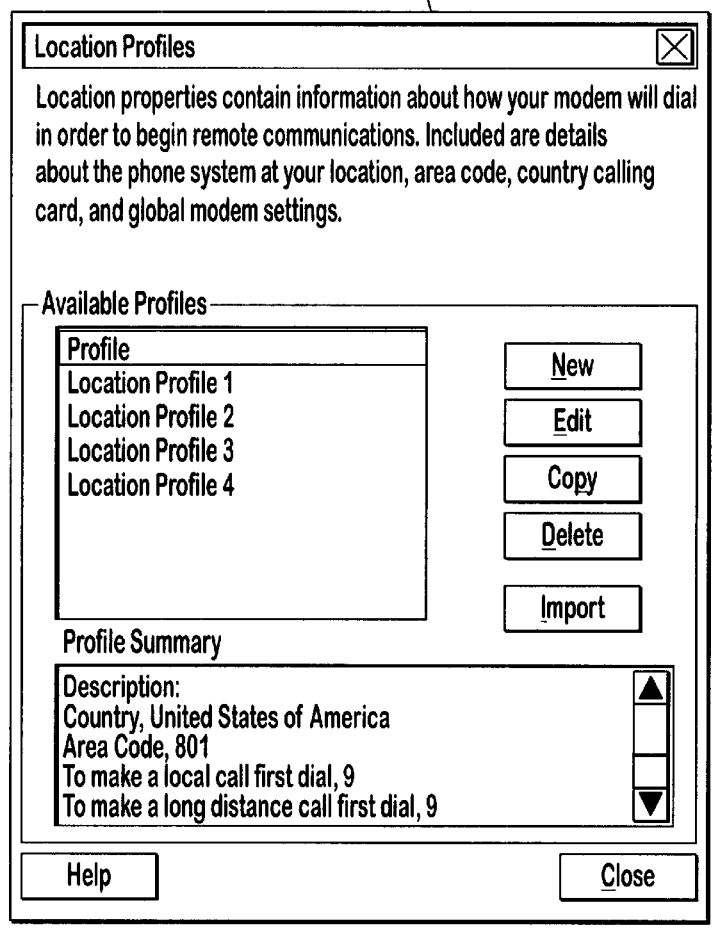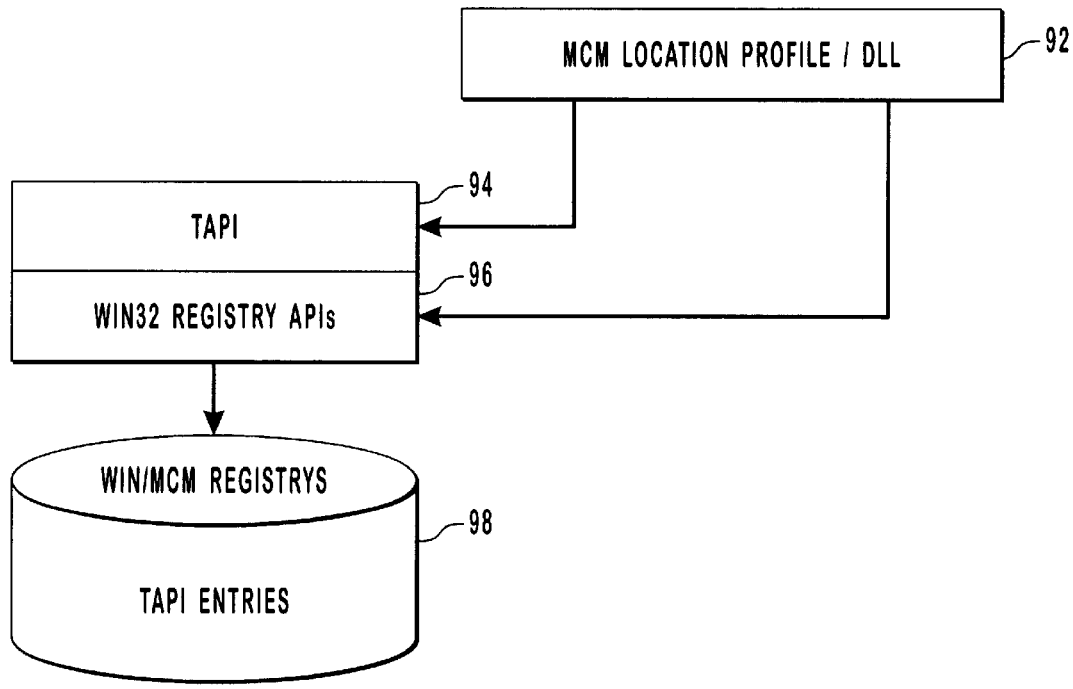
FIG. 9

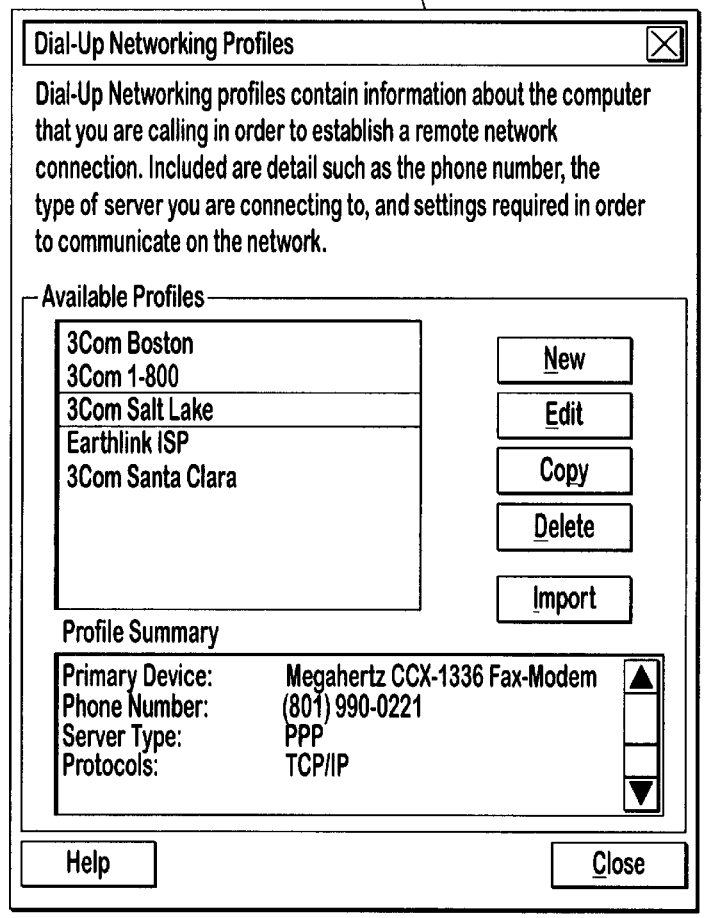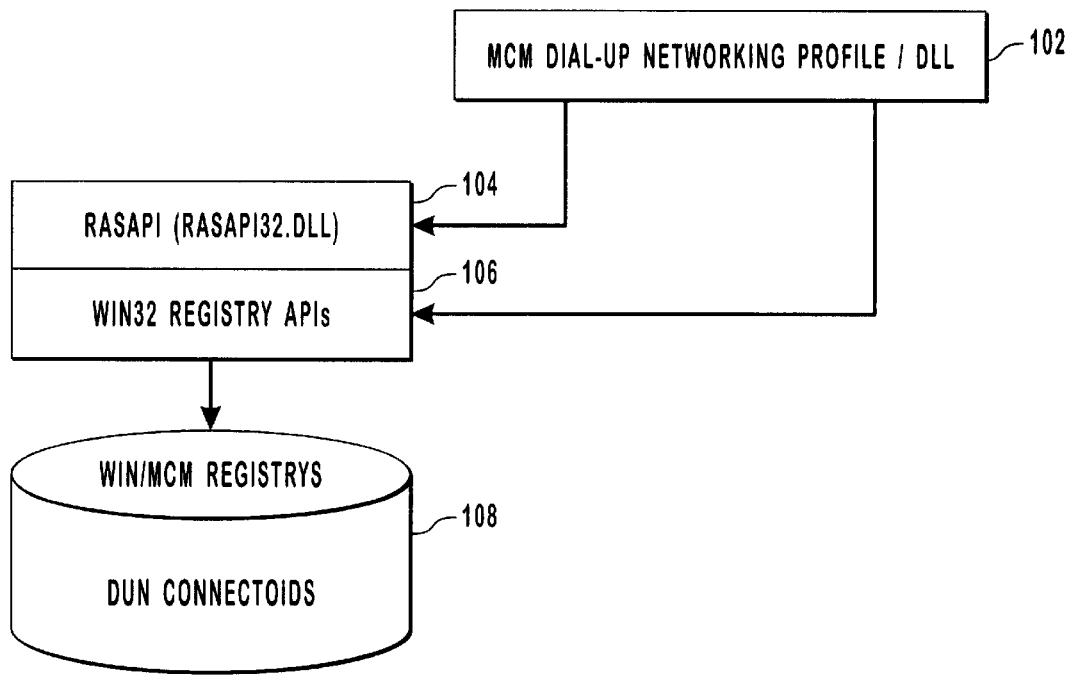
FIG. 10

NETWORK CONFIGURATION METHOD AND SYSTEM FOR A WINDOW-BASED OPERATING SYSTEM ENVIRONMENT

BACKGROUND OF THE INVENTION

1. The Field of the Invention

The present invention relates to methods for managing network configurations in a window-based operating system environment. More particularly, the present invention relates to a more intuitive configuration and selection process for facilitating the association of a computer employing a windows-based operating system with a network environment.

2. Present State of the Art

The effectiveness of general purpose stand-alone computers, such as personal computers, has been proven and is readily apparent in the successful nature of the personal computer marketplace. Those familiar with computers appreciate that their capabilities and ease of use has progressed substantially thereby enabling the masses to make use of such execution devices. While computers alone have reached successful levels, peripherals such as printers and other devices have also become prevalent due to the interactive environment made available by the personal computer. While computers and peripherals alone have been successful and widely accepted beyond any possible original expectations, computers have also made available methods of communication and data exchange that enable individual personal computers to communicate with other types of devices. To facilitate such intercomputer interaction, networks have proliferated which enable a plurality of computers or a mixture of computers and peripherals to interact one with another.

Those familiar with networking technology appreciate that various networking configurations have developed which provide individual advantages and limitations in their particular topology. For example, local area networks (LAN) lend value to co-located computers by enabling individual computers to communicate with other computers or peripherals without requiring specific dedicated peripherals for each computer. Similarly, wide area networks (WAN) find application in remotely located computer applications wherein a remotely located computer contacts one or more computers or peripherals typically via a telephone system or other communication channel.

While computers and peripherals may efficiently interact via a network, in order to facilitate accurate and reliable interaction, computers, and more precisely the operating system controlling the personal computer hardware interacting with the network, must be properly and precisely configured. While modern windows-based computer operating systems provide a somewhat streamlined visual interface, networking configuration details require a user to enter configuration parameters into a number of separate windows in order to operably and properly configure the personal computer for interacting in a compliant and precise manner on the network. For example, the Microsoft® Windows 95® operating system is one such windows-based operating system that enables networked operation of the personal computer upon which it resides.

Those familiar with the Windows 95 operating system appreciate that several parameters must be defined in order for a personal computer to operably interact on a network. For example, in a WAN network environment, a personal computer must be configured to include various information such as "dial-up network" information including telephone numbers, area codes and server type. Additionally, the personal computer must also store "location" information relating to information that is specific to the personal computer being configured. In order to configure the dial-up network information and location information, multiple windows must be visited and traversed in the exemplary Windows 95 environment. For example, to populate the dial-up networking information, a user must access the Windows 95 "programs" menu and select the "accessories" submenu and in turn select the "dial-up networking" subsubfolder. In that particular folder, a user must select specific information such as a particular modem and phone number.

Likewise, to select the "location" information which is also required for establishing a wide area network connection, a user must select and traverse a separate menu in order to populate the "location" information. For example, the network-configuring user selects the "settings" folder and within that particular settings folder selects the "control panel" window which enables a user to further select the modem setting and define the particular modem properties including specific dialing properties necessary for interfacing with a specific communication channel such as a telephone network.

It should be readily apparent that such an elementary configuration example for properly configuring a personal computer for interacting on a network has required a non-intuitive traversal of a plurality of menu windows. Additionally, specific "general access" properties must also be defined for completing the network configuration process. General access properties such as the definition of a particular proxy server are configured in the exemplary Windows 95 operating system by selecting the "settings" window. Within that particular window, the user must also select the "control panel" submenu and therein select the "Internet" option which further yet therein provides a plurality of tabulated windows, one of which is the "connection" tab which in turn permits the storage of one and only one defined proxy server.

Additionally, other general access properties include the specification of a default printer which requires a user to select the "settings" window and further select the "printers" subwindow. Yet additionally, another general access property that a user may wish to configure when defining a configuration of network parameters includes establishing the sharing of both file and print capabilities. Such a specification requires the user to select the "settings" window and therein further select the "control panel" subwindow and yet therein select the "network" option which presents the user with a plurality of tabular windows, one of which is the target "configuration" tabular window.

It should be apparent from the previous example that the proper configuration of a computer in a corresponding network, namely a LAN or WAN, is anything but intuitive and simplistic at least in the dominant windows-based operating system environment. Since network configurations have heretofore been largely static, in that computers traditionally joined a network and remained on that particular network for some duration, cumbersome approaches to establishing an operative configuration in an operating system were tolerated since they typically required only a single configuration ordeal. However, with the advent of integration and miniaturization, computers have become increasingly more portable and therefore mobile. Modernly, a typical computer user may be assigned a single computer that may serve as both their office computer and their mobile or portable computer. To facilitate the interaction of a computer with other computers or peripherals in an office environment, a traditional LAN must host the portable computer thereby enabling the portable computer to interact with other computers and peripherals. Such an association requires that the operating system of the portable computer be properly configured for interacting on the LAN. However, when a portable computer disassociates with a LAN and otherwise associates with either a different LAN such as in the case of either reassociating the portable computer in a different LAN environment or, in the case of a WAN, such as when a user may employ their portable computer for communicating via a telephone line to another network, the portable computer must reassociate or be reconfigured to operably interact over the new network. In such applications, a user is required to subject themselves to the aforementioned battery of menus and options and hope that their configurations are sufficiently precise to enable them to both communicate on the subsequent network and reverse the re-configuration process of the portable computer to operably reassociate with its original network.

While it has been briefly alluded to, diverse working environments are becoming more commonplace to the computing public. For example, it is not uncommon for a particular user to operate their portable computer in one office environment and subsequently visit another division or operation of their business entity and thereat associate their personal computer with the resident network. Alternatively, personal computer users may also be performing computational activities in other environments such as hotel rooms, home offices or virtually anywhere utilizing wireless transceiver technology. In such transient work environments of the present, iterative network configuration and reconfiguration processes are laborious and costly both in terms of the time associated with the reconfiguration process and the lost productivity when an operable configuration is delayed or unattainable.

To compound the mobility issues associated with personal computers, it is readily accepted that as computers become more essential tools in society, individuals that are less computer-literate increasingly become personal computer users. As such, these particular users are less adept at performing network configurations on their personal computers and rely more heavily on computer specialists such as network administrators. In such a scenario, a network administrator would traditionally configure a personal computer for operating in a dominant network environment wherein the particular personal computer user primarily resides. Therefore, since the reconfiguration of the network configuration settings is unduly cumbersome, the less-sophisticated computer user has heretofore been resigned to either operate off-line in secondary environments or rely upon a subsequent interaction with the network administrator either via telephone or by other means to walk the particular user through the series of network reconfiguration steps.

Therefore, it would be advantageous to have a software application or utility that provides an intuitive interface for performing the network configuration process without requiring a user to be intimately familiar with a particular operating system.

It would yet be a further advantage to provide a method and system for providing a common interface for configuring both LAN and WAN environments while maintaining commonalities thereby reducing redundancy between such configuration information.

It would yet be an additional advantage for a method and system to be capable of storing multiple network configurations for easy selection between multiple network environments.

It would yet be a further improvement over the prior art to have a method and system capable of storing a network configuration in a file that is independently transferrable to another computer for use in configuring that target computer to inter-operate in a specific network configuration.

A further improvement over the prior art could be manifest in a method and system that is capable of loading and transferring particular network configurations between computers without requiring the actual imputing and on-screen editing of the configuration files by the recipient computer user.

SUMMARY AND OBJECTS OF THE INVENTION

It is an object of the present invention to provide an application which provides for multiple mobile network configurations which may be configured by users, network administrator, personnel, or others for use in compatibly and operably configuring a personal computer so as to be capable of interaction in either a local area network environment or a wide area network environment without requiring cumbersome and nonintuitive reconfiguration by a user.

In the present invention, a mobile configuration is a collection of profiles that when applied or activated configure the user's computer to connect to a specific target network. In the present invention, a mobile configuration is comprised only of the necessary profiles required for interaction with the selected hardware device, e.g., a modem or network interface card.

In the present invention, a mobile configuration that employs a network interface card is comprised of a LAN profile and a general networking profile. A mobile configuration using a modem to establish a WAN connection is comprised of a location profile, a dial-up profile, and a general networking profile.

The mobile configuration manager application of the present invention provides to the user the ability to add, clone, modify, and delete mobile configurations and their associated profiles. If a mobile configuration has previously been created, the user may select it from a list of possible mobile configurations. A user may then choose to activate the mobile configuration, i.e., to instruct the mobile configuration manager of the present invention to change all system parameters to the values stores in the selected mobile configuration in order to facilitate the desired network connection. If no such mobile configuration has been created, the user may create a new configuration using the settings of an existing mobile configuration as a starting point or they may generate a mobile configuration from scratch.

The mobile configuration manager of the present invention also provides a mechanism for adding new mobile configurations other than by "manual" creation. In other words, the mobile configuration manager of the present invention allows a user to create and "export" a mobile configuration, or "import" a mobile configuration created by another entity. For example, if a network administrator creates a mobile configuration for a plurality of mobile configurations necessary for connecting a user to, for example, a corporate remote access server, the user need only select the corresponding mobile configuration with the mobile configuration manager application distributing the various parameters necessary for facilitating the selected network connection.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered limiting of its scope, the invention will be described and explained with additional specificity and detail through the use of the accompanying drawings in which:

FIG. 3 depicts the structural contents of exemplary configurations as depicted in a data structure format for storage as a configuration in the mobile configuration computer software utility of the present invention;

FIG. 4 is a data structure diagram listing the individual information or data comprising a location profile, in accordance with a preferred embodiment of the present invention;

FIG. 5 is a data structure diagram detailing the information or data structures comprising the dial-up network profile, in accordance with a preferred embodiment of the present invention;

FIG. 6 is a data structure diagram detailing the information or data comprising a LAN profile, in accordance with a preferred embodiment of the present invention;

FIG. 9 is a flow diagram of location profile data, in accordance with the preferred embodiment of the present invention;

FIG. 10 is a flow diagram of dial-up networking profile data, in accordance with the preferred embodiment of the present invention;

DETAILED DESCRIPTION OF THE PREFERRED EMBODIMENTS

As used herein, the term "software component" refers to any set of executable instructions separately cognisable to an operating system that manages a computer system. Examples would include separate processes, application programs, device drivers or any other such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specific communications protocol to transmit information from one physical connection to another. Those familiar with the art of networking and computer communication appreciate that various communication channels are available for communication between a personal computer and other devices. Furthermore, those familiar with networking appreciate that interaction through various communication channels requires a specific set of parameters to be determined in order to compatibly interact with other devices. Furthermore, the process for properly configuring a particular communication channel or network interface has heretofore been cumbersome and nonintuitive as described above.

The present invention provides a method and system for more; intuitively receiving configuration data and partitioning the configuration data into hierarchical and reusable components that may be shared among multiple network configurations. As used herein, a mobile configuration is a collection of data parameters known as "profiles" that, when applied or activated, configure the user's computer system to connect to a specific network. A particular mobile configuration is comprised only of the necessary profiles specific to the selected hardware device.

Figure 1:
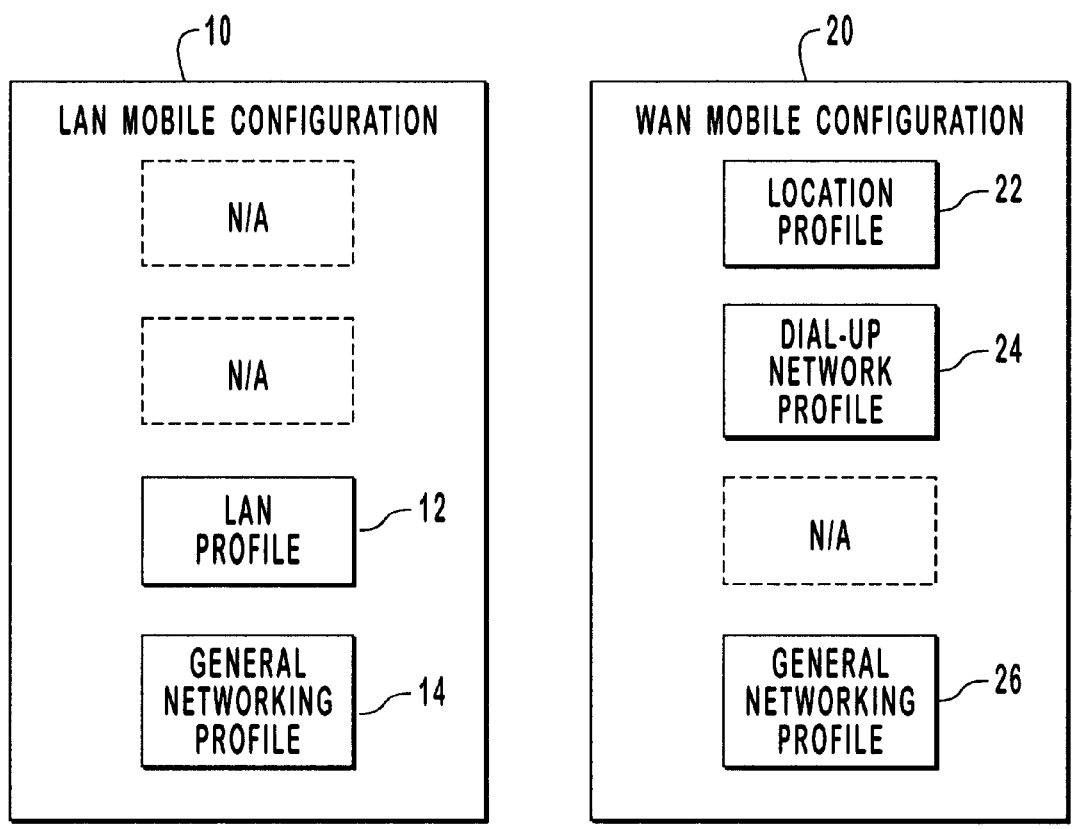
FIG. 1 is a block diagram showing the individual components or profiles that comprise each type of a mobile configuration structure.

The present invention provides for the configuration definition of two major classifications of configurations as depicted in FIG. 1. First, a LAN mobile configuration 10 denotes the requisite parameters required for interfacing a personal computer operating a windows based operating system, such as Microsoft® Windows 95®, Windows 98® or Windows NT® operating systems. Those familiar with computer to network connections appreciate that computers interfacing with networks require specific hardware such as a network interface card (NIC) for facilitating the requisite physical/electrical interface for compatible interaction. As introduced above, the requisite interoperative parameters required for network interaction whether over a local area network (LAN) or via a communication channel to a wide area network (WAN) comprise certain parameters for properly configuring and interacting with the specific network. In the present invention such parameters have been partitioned into specific groupings or profiles which enable the reuse of such configuration data between multiple configuration types.

A second type of mobile configuration is also depicted in FIG. 1 as WAN mobile configuration 20. While WANs may take on several particular topologies, the more common types are traditional dial-up networks which facilitate remote access by a computer with either a network's remote access server (RAS) or the ubiquitous Internet. The discrete partitioning of profiles associated with the configuration mechanism of the present invention is comprised of a location profile, a dial-up network profile, a LAN profile and a general networking profile. The specific data and parameters associated with each of these profiles will be discussed in detail below. It will be noted from FIG. 1 that neither of the two major types of mobile configurations, LAN and WAN, require every type of profile in order to properly configure the computer with the network. For example, LAN mobile configuration 10 requires the selection of a populated LAN profile 12 and a general networking profile 14 in order to provide the required parameters for fully enabling a configuration with a typical LAN.

Similarly, WAN mobile configuration 20 requires a location profile 22, a dial-up network profile 24 and a general networking profile 26 in order to profer the requisite number of parameters to enable the operating system to operate a transceiving device such as a modem for communication over a communication channel to a WAN. It should be apparent that in a mobile computer environment, a computer may need to communicate both locally on a LAN and remotely on a WAN thereby requiring reconfiguration for successive interoperability. It should also be apparent that the general networking profile 14 of LAN mobile configuration 10 and the general networking profile 26 of WAN mobile configuration 20 may be one and the same file with the parameter data being shared or linked in multiple configurations due to the preferred partitioning of networking parameters in the present invention, thereby reducing the need for a user to reenter redundant or common information upon reconfiguration for interaction with a different network. It should also be pointed out that one aspect of the present invention also provides for the one-time definition of all of the parameters necessary for configuring with multiple networks thereby only requiring the user to select a predefined graphical icon representative of an entire configuration which thereafter reconfigures the necessary communication parameters without burdening the user and requiring them to specifically and laboriously enter the subsequent parameters.

The present invention also provides the ability to add, clone, modify and delete mobile configurations. Additionally, the present invention also enables a user to add, clone, modify and delete profile entries which become the building blocks of mobile configurations. The present invention enables a user or a user's network administrator to create multiple mobile configurations. A mobile configuration is a set of the preferred settings of all communication-related system parameters for a given network and/or location that can be specified in advance. These preferred settings are categorized and stored in profiles. A user, upon arrival in a particular physical or logical "location" (e.g. hotel, branch office, airport lounge or a different network environment) may execute the mobile configuration manager application of the present invention to examine the list of existing and available mobile configurations.

Figure 2:
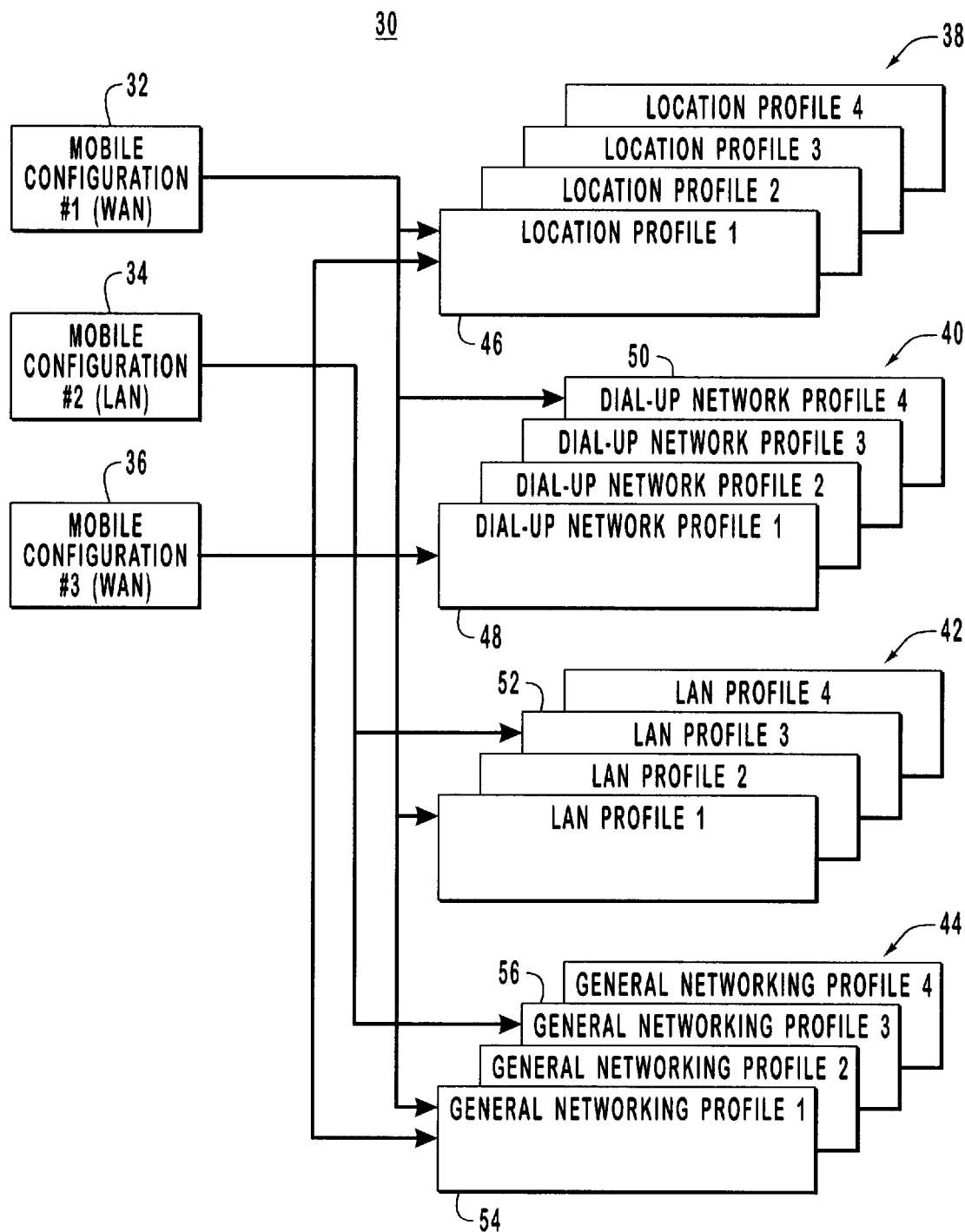
FIG. 2 is a block diagram illustrating exemplary mobile configurations and their underlying corresponding profiles, in accordance with a preferred embodiment of the present invention.

FIG. 2 depicts a plurality of mobile configurations 32, 34, and 36 representative of a first WAN, a LAN and a second WAN configuration, respectively. In the present invention, a mobile configuration manager application 30 enables a user to create a mobile configuration or to select between previously created mobile configurations. When selecting a particular mobile configuration, a user may choose to "activate" a particular mobile configuration, i.e., instruct the mobile configuration manager 30 to change all system parameters to the values stored in that particular mobile configuration in order to facilitate the desired connection.

The concept that a mobile configuration is a collection of profiles is reiterated in its depiction in FIG. 2 wherein mobile configuration 32, forming a WAN configuration, is comprised of a location profile 38, more specifically location profile 46, a dial-up network profile 40, more specifically dial-up network profile 50, and a general networking profile 44, more specifically general networking profile 54. Similarly, mobile configuration 34, having a LAN arrangement, is comprised of a LAN profile 42, more specifically LAN profile 52, and a general networking profile 44, more specifically general networking profile 56. Likewise, mobile configuration 36, forming a second independent WAN configuration, is comprised of location profile 46, dial-up network profile 48, and general networking profile 54.

In the present mobile configuration manager invention, when a particular mobile configuration has not been previously created, a user may create a new mobile configuration using the parametric settings in either an existing configuration by cloning the existing configuration as a starting point, or the user may create a mobile configuration from scratch.

Yet another novel feature of the mobile configuration manager of the present invention is that the mobile configuration manager provides a mechanism for adding new mobile configurations by methods other than manual creation. That is to say, the mobile configuration manager of the present invention allows a user to create and to "export" one or more mobile configurations for reuse by other computers. Additionally, yet another novel aspect of the present invention is its ability to "import" a mobile configuration created by or at another entity. For example, a network administrator may create a mobile configuration needed to connect to a business entity's remote access server from different points of presence throughout the world. In such an example, when a mobile user travels to a new region of the world, the user of the mobile configuration manager need only select a mobile configuration previously established to compatibly interact with a nearby remote access point.

Those familiar with programming in a Microsoft Windows environment appreciate that the system supports a portion of data store or accessible memory known as the "registry." In the preferred embodiment employing the Windows 9x operating system, the registry is comprised of at least one data file that is accessed using APIs of the operating system. The registry provides for a private portion which is usable by applications for data storage. In the present invention, the mobile configuration manager application utilizes a private portion of the registry Known herein as the "MCM" registry for the storage of application specific information including configurations. Additionally, those familiar with the Microsoft Windows operating systems appreciate that particular parameters and data used by the system are also retained in the registry. The particular mobile configurations depicted in FIG. 3, namely mobile configuration 60 and mobile configuration 62, are stored in a private portion of the registry, the MCM registry, as directed by the mobile configuration manager application upon execution. It should be pointed that the data structure of mobile configuration manager 60 and 62 are largely equivalent with only the specific contents stored in each of the data fields being potentially different. Again, data stored into the specific private portions of the registry, the MCM registry, are stored using Microsoft operating system APIs.

In FIG. 3, the mobile configurations 60 and 62 are comprised of a description field, a device type, a location profile, a dial-up network profile, a LAN profile and a general networking profile. It should be apparent that mobile configuration 60 is drawn to a WAN configuration since the corresponding requisite profiles are populated, while mobile configuration 62 is drawn to a LAN configuration. As described above, a configuration may be created from scratch or may be pre-populated via the copy or cloning option in the present application. In either case, the population of the requisite data fields corresponding to the particular network type must be specified. For example, in order to create a new configuration, a name must be provided which uniquely identifies the configuration. Additionally, an option field known as a "description field," may be provided wherein a user-friendly description of a particular configuration may be included. Additionally, in the device type field, the type of configuration being specified is denoted as either a modem device for use in a WAN environment or the specification of a LAN interface card namely a network interface card (NIC). The resultant profile specifications are specific to a profile as previously or contemporaneously defined. The particular configurations, as described above, are stored in the MCM portion of the registry in the preferred embodiment of the present invention. Additionally, portions of the profile information are also stored in the MCM portion of the registry while other profile parameters are stored in the standard Windows portion of the registry.

FIG. 4 depicts the data structure of a location profile 64, which describes the particular parameters associated with the user's location, primarily the user's communication network nuances required for operating with the communication network and establishing a WAN connection. In general, the location profile is comprised of parameters that describe the characteristics of the telephone system located at the user's position.

Location profile 64 in the preferred embodiment, is comprised of a name and a user-friendly description similar to that described above for the configuration name and description fields. Relating to the location information required in a location profile, a country parameter is specified denoting the actual country wherein the user is physically located when establishing a logical connection. Additional information such as an area code denoting the area code again of the location of the user. Additional communication channel nuances are also specified including any dialing sequences necessary for establishing an outside line access, long-distance access, as well as specifying communication channel features such as call waiting. Those familiar with establishing a traditional communication channel appreciate that specific dialing sequences are required when calling from one area code to another area code, or from one country to another country. By specifying such location information, the mobile configuration manager of the present invention may determine whether dialing from a present location to the dial-up location requires the addition of the foreign country dialing sequences.

The exemplary location profile 64 of the present invention further comprises an area code rules section which enables a user to specify when specific area codes are required to be included in a dialing sequence, as well as denoting those that require the inclusion of a long-distance dialing string. An additional field associated with the location profile 64 includes any calling card sequences desired to be included for use in the dialing process. Yet an additional parameter may include a global modem parameter, which is not part of the Windows 9X operating system, but is a profile parameter specific to the present invention, which when selected can notify specific types of modems to configure themselves in a manner such that the physical layer of the operating modem conforms with the local communication network parameters. That is to say, if a specific modem is detected as being a global modem capable of conforming to various national standards, then upon the activation of a specific configuration, this profile will read the country parameter out of the location profile and determine which code to send to the specific modem that enables the modem to set-up the internal hardware so as to be electrically compatible with the host communication network.

FIG. 5 depicts a dial-up network profile data structure 66 comprised of information which traditionally facilitates the joining of a personal computer with a remote network node to form a WAN connection. Those familiar with the Microsoft Windows operating system and its ability to connect with remote entities appreciate the concept of a connectoid which is similar in concept to the "profile" of the present invention, however, the connectoid does not utilize all of the same parameters as the profile concept of the present invention. The connectoid concept provides a specific record which prefers certain communication parameters for use in establishing a wide area network connection. In the present invention, the dial-up network profile 66 is comprised of a name specific to a single dial-up network profile and also is comprised of a description that provides a user-friendly alphanumeric description of the specific profile.

Yet another field in the dial-up network profile data structure is a primary device field, which the user selects from a list of installed communication devices such as modems, thereby enabling the association of a specific dial-up network profile with a hardware device, such as a modem. Additionally, in order to establish a WAN connection, the dial-up network profile must also be comprised of phone number information including an area code of the target interface, as well as the telephone number and a specification of the country. Such information when used in conjunction with the user location information specified in the location profile, enables the mobile communication manager to determine a specific dialing string, including any foreign dialing prefixes, country codes, or long-distance parameters in order to establish the requisite communication network to facilitate the establishment of a wide area network connection.

Yet another additional field in the dial-up network profile data structure is the specification of a server type, including the type of network protocols used, as well as specific TCP/IP information. Those familiar with wide area network parameters appreciate that entities residing on the network are required to have an IP address and must also specify the IP addresses of target domain name service servers, as well as WINS servers. Additionally, the present invention also facilitates the use of scripting which specifies sequencing such as the processing of a log-in procedure or other front-end access sequencing which further streamlines a user's admission into a wide area network. In an alternate embodiment of the present invention, a multi-link parameter is also provided which facilitates the establishment of a plurality of a communication channels for augmenting or improving the available bandwidth presented to a user in a specific WAN connection session.

FIG. 6 depicts a LAN profile data structure 68 for use in establishing a local area network connection by a user. The LAN profile 66 also incorporates naming and description capabilities similar to those of the previous profile types. The LAN profile data structure of the present invention also incorporates a device description which typically specifies a specific network interface card (NIC) for use in opening a port through which data may be exchanged during a particular local area network session.

The LAN profile data structure of the present invention is also comprised of an IP address portion wherein either a specific assigned IP address may be specified, including any submask associated therewith or, alternatively, in a DHCP-capable networking environment, the automatic addressing feature for assigning an available IP address to a network node or user upon the association with the DHCP-capable network may be enabled.

Yet an additional parameter within the LAN profile data structure is the gateway data field which specifies an IP address of a specific gateway or may also be comprised of an installed gateway list of individual gateways. Furthermore, the LAN profile data structure is yet additionally comprised of domain name service parameters which specify whether the DNS feature is enabled and the host and domain associated therewith, as well as an IP address list of the domain name servers, and any associated domain suffix. Likewise, the present invention supports the Windows Internet Name Service (WINS) integral with the Microsoft Windows operating systems.

Figure 7:
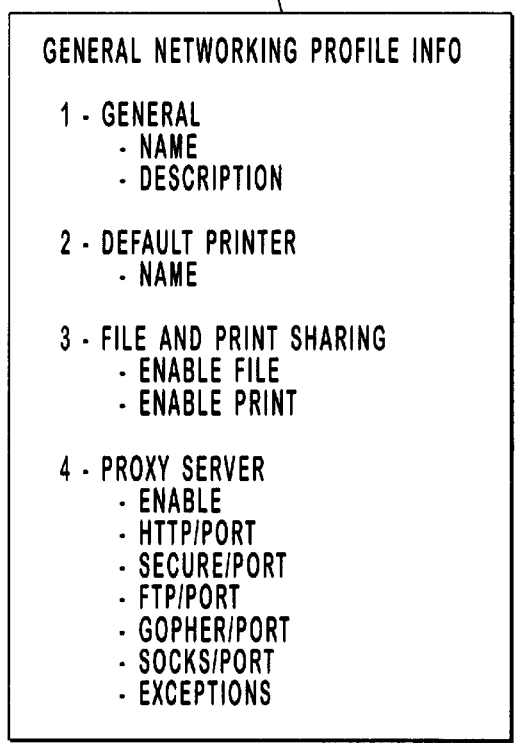
FIG. 7 is a data structure diagram detailing the information or data comprising a general networking profile, in accordance with a preferred embodiment of the present invention.

The final profile configuration employed by the present invention is exhibited in FIG. 7 and is a general networking profile data structure 70. The general networking profile includes information related to general preferred features including information related to a client machine access control and proxy servers. Such information must be specified in either a LAN connection or in a WAN connection. Like the previous profiles, the present profile also is comprised of a name and a description data field and also facilitates the specification of a default printer according to a specified name, in addition to storing the file and print sharing preferences. Those skilled in the art appreciate that the specification of a default printer, for example, enables a user to employ the specified printer upon the establishment of a network connection. Under the general networking profile data structure, a proxy server may also be specified, including any specific protocols and ports associated therewith.

Figure 8:
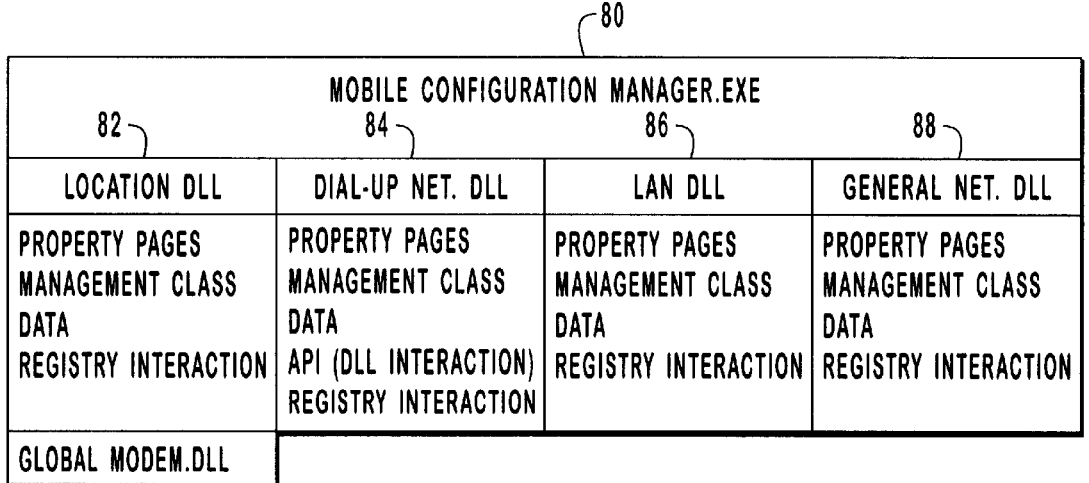
FIG. 8 is a structure diagram depicting individual components of the mobile configuration manager software, in accordance with the preferred embodiment of the present invention.

FIG. 8 depicts various software components which comprise the mobile configuration manager. The mobile configuration manager application of the present invention is preferably a menu and event driven application capable of organizing network configuration settings into logical groups and is also capable of activating certain sets of those logical groups in order to operably facilitate a communication network connection. Those familiar with structured programming appreciate that applications are often comprised of a plurality of modules, including dynamically loaded libraries (DLL) which support the overall functionality of the application. As described above, the overall purpose of the mobile configuration manager application is to centralize and streamline the configuration of standard windows-based network configurations for dial-up WAN connections utilizing a device such as a modem, and Ethernet (LAN) network connections. The present application in its preferred embodiment accomplishes this by providing a mechanism whereby users may configure multiple profiles, each of which use a specific connection device, either a modem or NIC, to make the network connection. The primary function of the mobile configuration manager is to provide configuration settings such as modem configurations, dialing parameters, serial line protocols and IP parameters.

The mobile configuration manager is designed in a hierarchal fashion which includes a mobile configuration manager executable 80, location DLL 82, dial-up network DLL 84, LAN DLL 86 and general network DLL 88. Each of these DLLs are comprised of executable code that perform the management of property pages for enabling a user to both edit and view data information, as well as software that facilitates the interaction with the registry, including the MCM portion of the registry, as well as the standard Windows portion of the registry.

The location DLL 82 incorporates functionality including TAPI, registry handling routines, and is further comprised of a management class to handle the management of such things as dialing profile and calling card data arrays. An additional DLL is depicted in FIG. 8 as Global Modem DLL 83, known for performing the function of interacting with the modem in order to forward global modem configuration commands. The exemplary operational scenario proceeds such that upon the initiation of the location DLL 82, the specified country is indexed into a country code that is understandable by a global modem. The country code is then sent to the global modem via DLL 83. Any interaction between each of the DLLs and the MCM.EXE 80 is performed using management classes and functions.

Dial-up network DLL 84 also maintains property pages, as well as management class functionality for use in manipulating the data associated with the dial-up profiles. Dial-up network DLL 84 is further comprised of registry interaction code for interacting with the corresponding registry portions. Similarly, LAN DLL 86 is also comprised of property page and class information for manipulating the respective data associated with a LAN profile, as well as being comprised of registry interaction software for interacting with the respective registries. Also similarly, general networking DLL 88 is comprised of similar components for interacting with the respective data elements.

FIG. 9 is a data flow diagram depicting the specific data flow of parameters associated with the location profile. Location menu profile 90 depicts a series of available profiles which may be edited, copied, deleted, or imported including descriptions associated with those profiles. Upon the selection of a specific profile, the location profile data in conjunction with the DLL depicted as reference 92 may retrieve and write data to and from the registry 98. In order to interface with the corresponding registries, DLL 92 employs the Windows Operating System TAPI 94 commands as well as Windows 32 registry APIs 96. Those familiar with the art of network programming and Windows environment, appreciate that TAPI 94 is a custom set of telephone interactive API commands utilized by applications for the specific transfer of communication network information.

Similarly, FIG. 10 depicts a dial-up network profile menu 100 which passes dial-up network profile parameters using the DLL jointly depicted as reference 102 by employing RASAPI 104 and Win 32 registry APIs 106 for interaction with the Windows and MCM registry 108. It should be appreciated that specific code may be written that bypasses the Windows-provided APIs, however, utilizing such functionality provided by the operating system enhances the performance of the software and maximizes the reliability of functions available to an application programmer.

Figure 11:
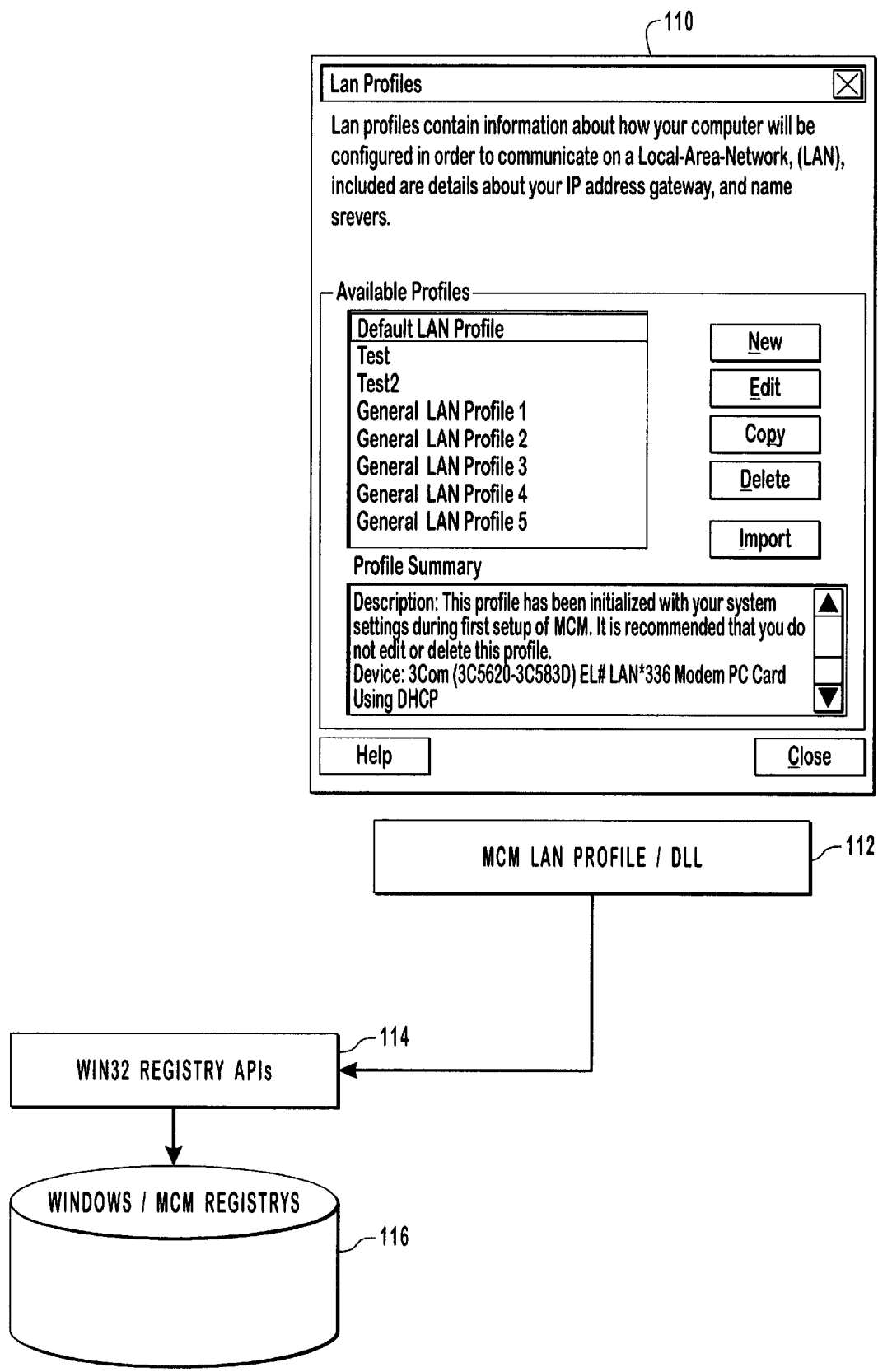
FIG. 11 is a flow diagram of LAN profile data, in accordance with the preferred embodiment of the present invention.

FIG. 11 depicts a LAN profile menu 110 which provides a user front-end for the editing, copying, etc. of specific LAN profiles. In FIG. 11, LAN profile data in conjunction with the LAN DLL, jointly depicted as reference 112, are updated and exchanged to the MCM and Windows registry 116 via the use of Win 32 registry APIs 114. Specific sequencing and ordering of commands between the DLL and the registry are depicted for each of the configuration types in FIG. 13.

Figure 12:
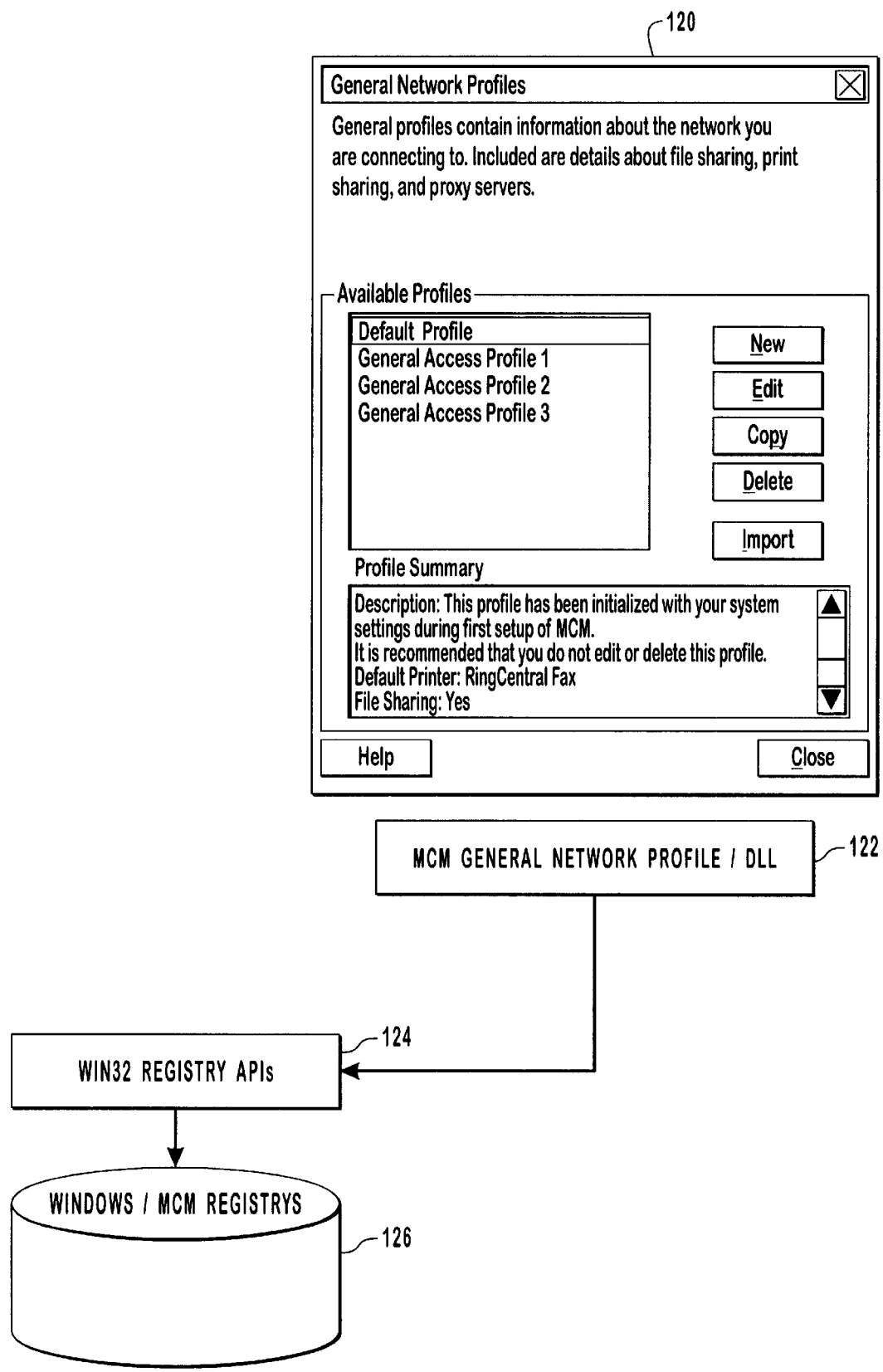
FIG. 12 is a flow diagram depicting the flow and storage of general networking profile data, in accordance with the preferred embodiment of the present invention.

FIG. 12 depicts a data flow of general networking profile data. A general network profile menu 120 depicts various general network profiles in menu-accessible form. The actual exchange of general network profile data through the use of the general network DLL, jointly depicted as reference numeral 122, is transferred through the use of Win 32 registry APIs 124 with MCM Windows registry 126.

Figure 13A:
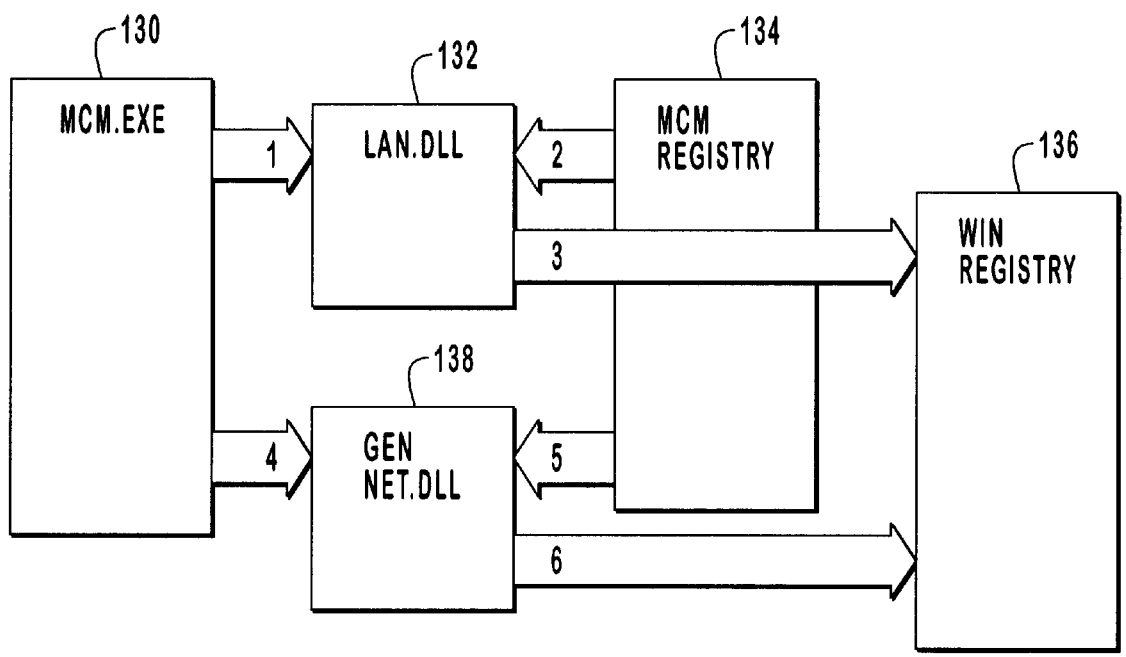
FIGS. 13A and 13B are flow diagrams of the specific flow of data from each of the profiles during activation of a specific configuration.
Figure 13B:
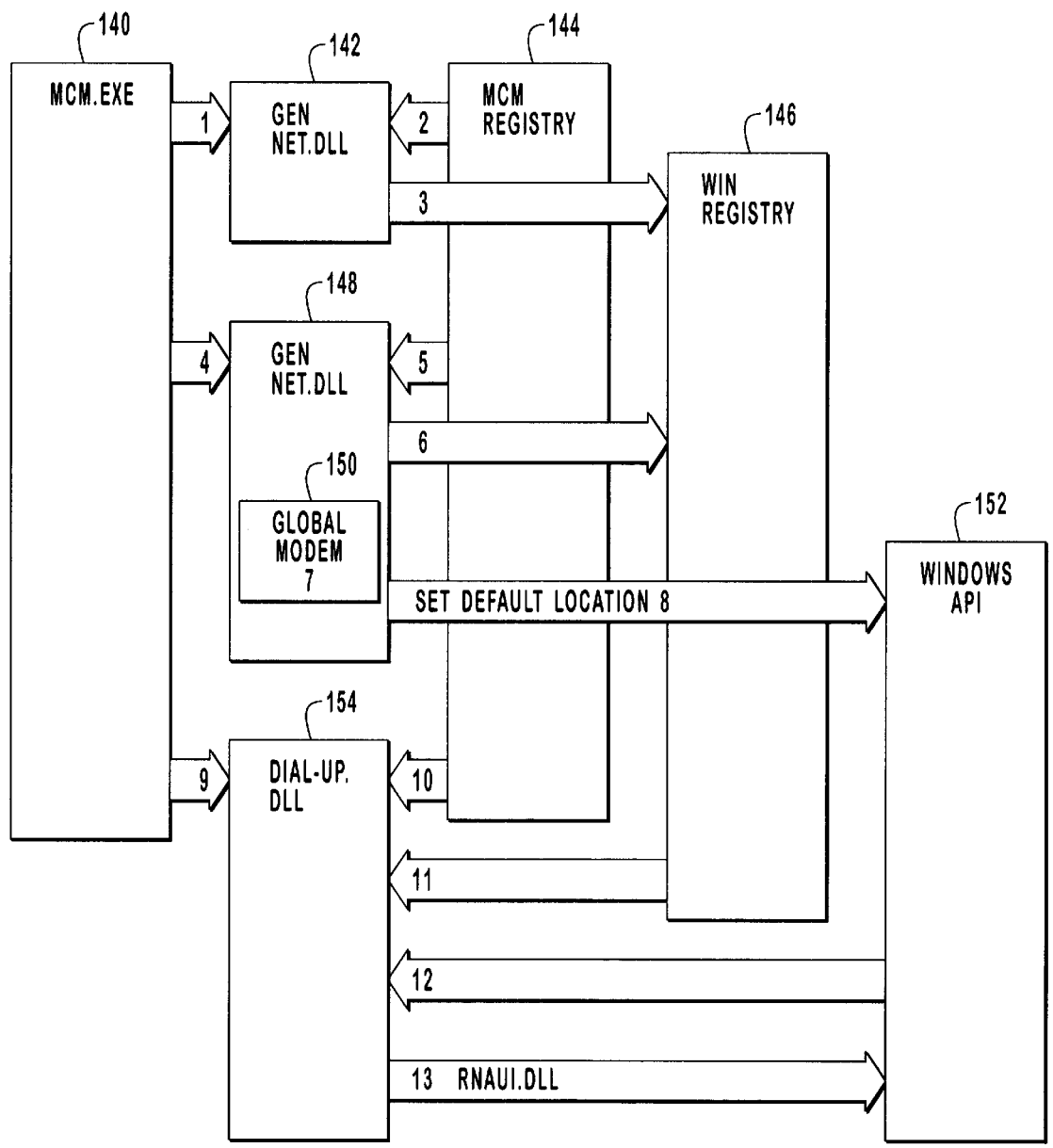

FIGS. 13A and 13B depict the activation of a particular mobile configuration by a user. In the present invention, when a user has either caused the communication parameters to change either by changing location or by desiring to configure a network communication using different parameters, the user must select and activate a different mobile configuration.

FIG. 13A depicts an activation sequence for making a LAN configuration become the active configuration. When a user selects a stored configuration icon corresponding to a previously defined and stored LAN configuration, the MCM.EXE 130 passes processing into the LAN.DLL 132 which is comprised of code that is specific for the retrieval and installment of LAN-specific parameters. More particular, LAN.DLL 132 retrieves the LAN profile as designated in the user-selected mobile configuration from the private portion of the MCM registry 134 that is utilized by the mobile configuration manager application. Yet even more precise, in the preferred embodiment, the MCM.EXE 130 retrieves the various profiles for storage in memory upon initiation of the application, however, for purposes of illustration, it is generally depicted in the sequential data flow steps of FIG. 13A.

Following the retrieval of the corresponding LAN profile in what is depicted as first and second steps in FIG. 13A, the LAN.DLL 132 writes the requisite LAN parameters or the proper IP settings out to locations in the Windows registry 136 in a third step. Those familiar with the networking topology of the exemplary Windows 9X operating system appreciate the particular parameters that are required to be populated within the Windows registry such as IP address, etc.

As described above, the LAN configuration also requires a general profile in order to fully describe the LAN settings. Following the loading of the LAN profile parameters, the MCM.EXE 130 in a fourth step passes control to the General Network DLL 138 which reads the selected general network profile parameters from the MCM registry 134 and in a sixth step, writes the corresponding requisite parameters into Windows registry 136.

Those familiar with the traditional Windows 9X configuration process as described in the Background above, appreciate that any network parameter changes previously required that the operating system be rebooted. However, in the mobile configuration manager application of the present invention, the operating system is only rebooted in those situations where the change in parametric data absolutely requires a reboot process.

FIG. 13B depicts the WAN activation process, which occurs upon the selection of a specific WAN configuration by a user. In the present invention, the MCM.EXE 140 passes control in an first step to GENERAL NETWORK.DLL 142 which is comprised of a specific networking functionality, described in conjunction with FIG. 8. In a second step, GENERAL NETWORK.DLL 142 reads a specific general networking profile as identified in the selected mobile configuration from the MCM registry 144. In a third step, the GENERAL NETWORK.DLL 142 writes the corresponding network parameters into the Windows registry 146. The processing by the GENERAL NETWORK.DLL 142 is then complete.

As described above, a WAN mobile configuration is comprised of a location profile, which must also be read in order to properly configure the operating system for interaction with the corresponding modem. In a fourth step, the MCM.EXE 140 passes control to LOCATION.DLL 148 which reads from the MCM registry 144, corresponding location profile parameters, which are subsequently written in a sixth step to the Windows registry 146. As described above, the present mobile configuration manager application also is comprised of global modem capabilities which enable the application to determine the present country within which the computer is operating. From such country information, the application determines the corresponding global modem-capable modem commands that should be transmitted either via AT commands or otherwise to a global modem-capable modem, which contains functionality that is programmable and therefore reconfigurable so as to be electrically compatible with a particular communication network such as a specific telephone system. Such global modem functionality is comprised, in the preferred embodiment, within LOCATION.DLL 148 as global modem functionality 150. As a final step in the processing associated with LOCATION.DLL 148, in an eighth step, as depicted in FIG. 13B, the LOCATION.DLL 148 interacts using a Windows API 152 in order to set the appropriate default location thereby informing the Windows operating system of the new default location and the profile associated with the present configuration.

Yet an additional profile associated with a WAN configuration is a dial-up profile. The MCM.EXE 140 is also required to load the dial-up parameters and does so by calling or passing the processing to DIALUP.DLL 154 in a ninth step. DIALUP.DLL 154 reads the dial-up profile as designated in the requested WAN configuration in a tenth step from the MCM registry 144. The DIALUP.DLL 154 also reads parametric information from the Windows registry 146, and performs an API call. In a final step, the DIAL-UP.DLL 154 invokes or calls the RNAUI.DLL, an internal Microsoft Windows DLL, to start the dialing process. The invocation of RNAUI causes a dialog box to appear for initiating the dialing of the created dialing system. Once the dialing process is started, the mobile configuration manager application has completed its activation functionality and remains idle through the dialing and connection process.

The mobile configuration manager software application also facilitates the creation of a profile by a user on a remote machine, which may then be "exported" to a single-file format that may be transferred, among other methods, either via e-mail, floppy disk, or downloaded from a WEB site. The specific profile may then be moved to a different user's computer where another user of the mobile configuration manager may thereafter "import" the profile into the mobile configuration manager and begin using it. In the present invention, the mobile configuration manager provides a configuration import menu, which employs a standardized Windows file selection dialog for selecting the file from which to import. Similarly, the mobile configuration manager also provides access to a configuration export menu, which enable a user to interact with an export dialog utilizing standardized Windows file selection dialogues through which files may be exported.

Similarly, the mobile configuration manager also facilitates the "import" and "export" of entire mobile configurations, including their accompanying profiles. In the preferred embodiment of the present invention, the configuration manager also facilitates the importing of a profile or a configuration having a different name or in the case when the configuration, or profile assume the same name as an existing profile or configuration, the existing profiles or configurations are renamed, thereby enabling the newly imported profile or configuration to assume the definitional characteristics as described by the profile or configuration's author. By allowing an imported configuration or profile to displace an existing similarly named profile or configuration, a network administration may provide to a user a profile or a configuration having a known state.

A mobile configuration manager application has been presented, which provides a user-friendly environment for the creation and selection of configurations that are both modular and intuitive in their creation as well as easily selectable and easily activated upon the reassociation or relocation of a personal computer into a subsequent environment requiring different configuration parameters in order to establish a compatible and reliable network connection.

The present invention may be embodied in other specific forms without departing from its spirit or essential characteristics. The described embodiments are to be considered in all respects only as a illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. Computer executable instructions stored on a computer readable medium, the executable instructions for setting communications network parameters to connect a communications device to a communications network, the executable instructions for performing steps comprising:

initiating a user interface dialog for input of at least one of a plurality of network configuration profiles, including:

(a) a location profile that includes at least one parameter needed to connect the communications device to a wide area network (WAN) communications network;

(b) a dial-up network profile that includes at least one parameter needed to connect the communications device to a remote network node via the WAN;

(c) a local area network (LAN) profile that includes at least one parameter needed to connect the communications device directly to a local area network (LAN) communications network; and (d) a general networking profile that includes at least one parameter that identifies a network resource that can be accessed by the communications device via the WAN or the LAN;

storing at least one network configuration profile inputted via the user interface dialog into a data storage location;

configuring the communications device in accordance with the contents of the data storage location, whereby the communications device is thereafter enabled to communicate via the communications network; and automatically calculating a dialing parameter based upon the contents of the location profile and the dial-up network profile, the dialing parameter thereafter being used to establish a connection between the communications device and the remote network node via the WAN communications network.

2. Computer executable instructions as defined in claim 1, wherein the communications device is selected from one of the following: a modem; and a network interface card.

3. Computer executable instructions as defined in claim 1, wherein the location profile includes at least one of the following parameters: country identifier; area code; outside line access sequence identifier; long distance access identifier; call waiting disable sequence; and calling card sequence.

4. Computer executable instructions as defined in claim 1, wherein the dial-up network profile includes at least one of the following parameters: remote network node identifier; remote network node area code; remote network node telephone number; remote network node country identifier; network protocol identifier; and remote network node address identifier.

5. Computer executable instructions as defined in claim 1, wherein the LAN profile includes at least one of the following parameters: a unique communications device identifier; communications device LAN address identifier; LAN gateway identifier; and LAN domain name service identifier.

6. Computer executable instructions as defined in claim 1, wherein the general networking profile includes at least one of the following parameters: default printer identifier; file storage access parameters; printer access parameters; and proxy printer identifier.

7. Computer executable instructions as defined in claim 1, wherein the calculated dialing parameter includes at least one of the following: a foreign country dialing prefix; a country dialing code; and a long-distance dialing parameter.

8. Computer executable instructions as defined in claim 1, wherein the at least one network configuration profile is stored into a data storage location selected from one of the following:

a local area network (LAN) mobile configuration data structure containing the LAN profile and the general networking profile, wherein the contents of the LAN mobile configuration data structure can be used to configure and enable the communications device to communicate via a LAN communications network; and a wide area network (WAN) mobile configuration data structure containing the location profile, the dial-up network profile, and the general networking profile, wherein the contents of the WAN mobile configuration data structure can be used to configure and enable the communications device to communicate with the remote network node via a WAN communications network.

9. Computer executable instructions as defined in claim 8, further comprising executable instructions for performing the step of associating a unique graphical icon with the LAN mobile configuration data structure and a unique graphical icon with the WAN mobile configuration data structure, so that selection of either of the unique graphical icons by a user will cause the communications device to be configured in accordance with the profiles stored within the corresponding data structure.

10. Computer executable instructions as defined in claim 1, wherein the the plurality of network configuration profiles are stored into a dedicated operating system data space via a predefined operating system programming interface.

11. A method for setting network configuration parameters to enable a computer to communicate via a selected communications network, the method comprising the steps of:

displaying a graphical user interface dialog on a computer display;

from the graphical user interface dialog, prompting a user to select the type of communications network for which a configuration data structure is to be generated, wherein the communications network type can include a remotely connected wide area network (WAN) or a directly connected local area network (LAN);

from the graphical user interface dialog, prompting a user to input a plurality of network configuration parameters, including at least a location profile having at least one parameter needed to connect a computer to the communications network and a dial-up network profile that includes at least one parameter needed to connect a computer to the communications network;

automatically calculating a dialing parameter based upon the contents of the location profile and the dial-up network profile, the dialing parameter capable of being used to establish a connection between a computer and the communications network;

creating a mobile configuration data structure that contains the plurality of network configuration parameters and the dialing parameter needed for communications on the selected communications network;

exporting the configuration data structure to a computer-readable medium;

importing the configuration data structure from the computer-readable medium at a second computer; and configuring the second computer in accordance with the contents of the configuration data structure, whereby the second computer is thereafter enabled to communicate via the selected communications network.

12. A method as defined in claim 11, further comprising the step of associating a unique graphical icon with the configuration data structure so that selection of the unique graphical icon by a user at the second computer will cause the second computer to be configured in accordance with the contents of the data structure and thereafter be enabled to communicate via the selected communications network.

13. A method as defined in claim 11, wherein in the step of importing, the configuration data structure is stored in a dedicated operating system data space area via a predefined operating system programming interface at the second computer.

* * * * *

UNITED STATES PATENT AND TRADEMARK OFFICE
CERTIFICATE OF CORRECTION

PATENT NO. : 6,493,751 B1
DATED : December 10, 2002
INVENTOR(S) : Tate et al.

It is certified that error appears in the above-identified patent and that said Letters Patent is hereby corrected as shown below:

Column 4.
Line 9, change "imputing" to -- inputing --
Line 43, change "stores" to -- stored --

Column 6,
Line 20, change "more;" to -- more --

Column 8,
Line 34, change "Known" to -- known --

Signed and Sealed this

First Day of July, 2003

JAMES E. ROGAN
*Director of the United States Patent and Trademark Office*